Oct. 25, 1938.    W. B. OSBORNE    2,134,315
TRANSMISSION SYNCHRONIZER
Filed Sept. 23, 1936
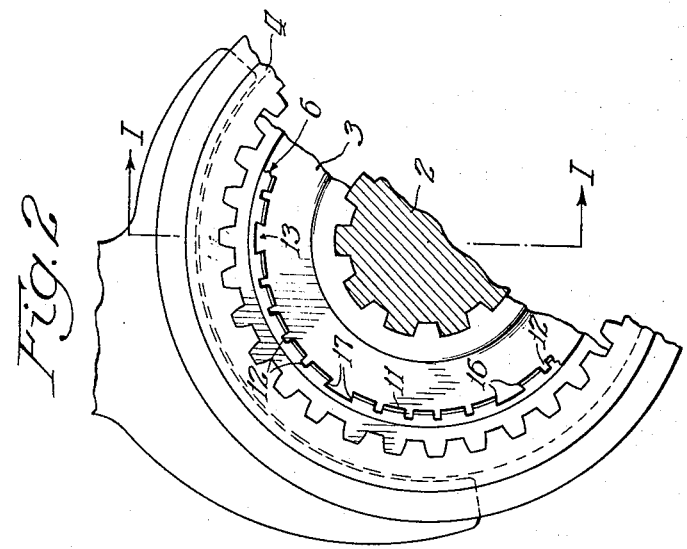
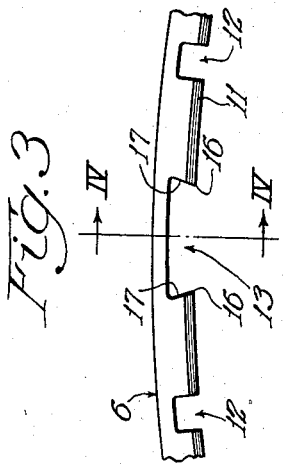
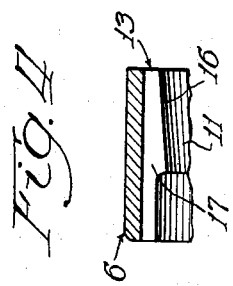
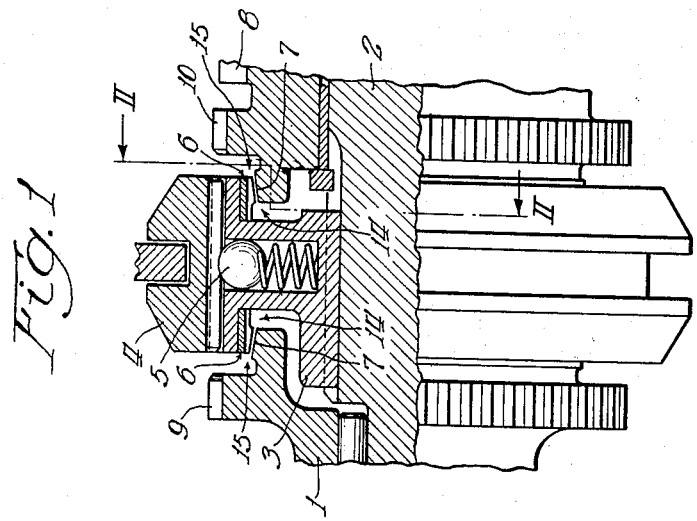
Inventor:
William B. Osborne
By Edward C. Gritzbaugh
Atty.

Patented Oct. 25, 1938

2,134,315

UNITED STATES PATENT OFFICE 2,134,315

TRANSMISSION SYNCHRONIZER

William B. Osborne, Muncie, Ind., assignor to Borg-Warner Corporation, Chicago, Ill., a corporation of Illinois Application September 23, 1936, Serial No. 102,072

5 Claims. (Cl. 192—53)

This invention has to do with transmission synchronizers and is concerned more particularly with an improvement in synchronizer ring construction.

It is an object of the invention to provide a synchronizer ring so constructed as to substantially increase the frictional grip between the same and a cooperating friction surface.

It is a further object of the invention to provide a synchronizer construction in which one of the synchronizing surfaces is formed to wipe the oil or other lubricant from the other surfaces sufficiently to enable said surfaces to tightly grip each other.

It is a further object of the invention to provide a synchronizing member with means formed in the friction surface thereof to wipe the complemental surface as the surfaces are forced together.

Another object of the invention involves the provision of a synchronizing member so formed as to provide a wiping action whose efficiency is maintained notwithstanding wear.

It is a still further object of the invention to provide a synchronizing structure affording adequate grip between the cooperating members without substantial interference with flow of transmission lubricant.

Still another object is to provide a heat-dissipating synchronizer ring.

Further objects and advantages of the invention will appear as the description proceeds.

The invention will be best understood by reference to the following description of an embodiment thereof, shown in the accompanying drawing, wherein:

Fig. 1 is a longitudinal fragmentary view, partly in section and partly in elevation, of a transmission mechanism embodying the invention.

Fig. 2 is an elevation of a synchronizer ring embodying the invention, taken substantially as indicated by the line II—II in Fig. 1.

Fig. 3 is a fragmentary enlarged view of a part of Fig. 2.

Fig. 4 is a sectional view taken substantially as indicated by the line IV—IV in Fig. 3.

Referring now particularly to the drawing, there is shown in Fig. 1 a synchronizer construction of the character which may be found in mobile and stationary installations, substantially all parts illustrated being conventional with the exception of the parts constituting the present invention.

The shaft 1 is here illustrated as the drive shaft of the transmission and the shaft 2 as the transmission main shaft. The main shaft floatingly carries a clutch hub 3 about which a clutch collar 4 is slidably splined. The hub and collar are yieldably held in the assembly shown by a spring pressed plunger or poppet 5. The hub rigidly carries, as by hot press fit, friction rings 6 constructed in accordance with the principles of the invention as will appear hereinafter. These rings are arranged for engagement with the inner cones 7 carried respectively by the drive shaft 1 and a second speed gear 8 rotatably mounted on the driven or main shaft 2, to establish substantial synchronism prior to engagement of the collar 4 respectively with the drive shaft clutch teeth 9 and the second speed gear clutch teeth 10.

Adequate grip between the surfaces is dependent among other things upon dry engaging surfaces. Past cone ring constructions have been faulty in this respect. Some such constructions have narrow slots but even they have been found unsatisfactory. In accordance with the invention, a friction ring 6 having a friction cone surface 11 and, if desired, conventional narrow transverse slots 12, is formed with substantially wider dovetail-like slots 13. With the slots 13, it will be appreciated that there will be a rapid passage of transmission oil between the points 14 and 15, the acute corner edges 16 serving as wipers to rapidly clean the inner cone 7 at the same time. The number of such dovetail slots may be varied, six having been found satisfactory. The slots 12 are preferably of smaller width, and may be omitted if desired, in order that an adequate amount of friction surface 11 on the cone may be provided for cooperation with the inner cone 7. The dovetail slots 13 are sufficiently few in number to warrant their substantial width without materially detracting from the gripping efficiency of the surface 11.

It will be observed that by dovetailing the slots 13, knife-edge self-honing or -sharpening wiping corners 16 are afforded, said corners serving more adequately to clean the oil from the surface of the cooperating cone, and said slots providing enlarged pockets and flaring walls 17 facilitating the radially outward substantially centrifugal flow of the oil.

The interruption of the surface 11 provided by the various slots serves the additional function of providing protuberances alternating with the slots and functioning as heat-dissipating fins.

The rings 6 may be formed of any suitable material such as graphite bronze having the desirable friction and wear-resistant characteristics.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. As an article of manufacture, a synchronizing member having a substantially annular gripping surface traversed by a dovetail slot providing an edge adapted to wipe oil from a complemental surface and also providing an enlarged conduit for the wiped oil.

2. As an article of manufacture, a synchronizing member having a substantially annular gripping surface traversed by a dovetail slot providing an edge adapted to wipe oil from a complemental surface and also providing an enlarged conduit for the wiped oil, said slot being of substantial depth and width relative to its length to provide for adequate disposal of the wiped oil.

3. As an article of manufacture, a synchronizing member having a substantially annular gripping surface traversed by a dovetail slot providing opposed edges selectively adapted to wipe oil from a complemental surface when the relative rotation of one of the surfaces is in either direction, said dovetail slot providing an enlarged conduit to facilitate disposal of the wiped oil.

4. As an article of manufacture, a synchronizing member having a substantially annular gripping surface traversed by a plurality of slots, certain of which are of substantially greater width than depth and having opposed side walls which converge outwardly, thus providing an edge adapted to wipe oil and providing a conduit for the wiped oil.

5. In an oil lubricated transmission including driving and driven members, said members comprising means defining a first friction surface and means defining a second friction surface complementary to said first named surface, means for effecting selective engagement between said friction surfaces to bring said members to the same speed, said first friction surface being characterized by having formed therein a plurality of slots extending the full width thereof, said slots being defined in part by outwardly converging side walls, each of said walls forming with said first named friction surface an acute angle defining a cutting edge for quickly cutting through said lubricant, said slots being effective to quickly convey said lubricant away from said friction surfaces upon interengagement thereof.

WILLIAM B. OSBORNE.